No. 862,336. PATENTED AUG. 6, 1907.
F. V. KALLAB.
COLOR COMPARATOR.
APPLICATION FILED APR. 15, 1907.
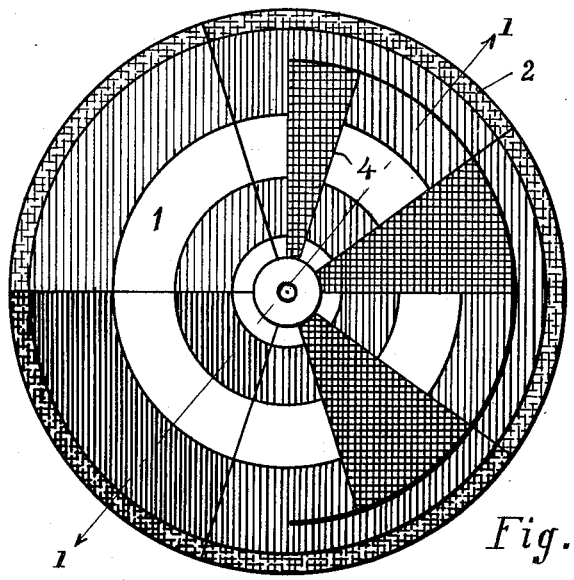
Fig. 1.
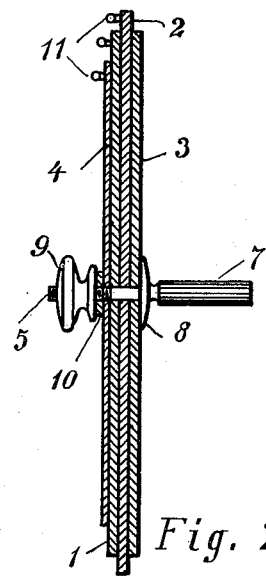
Fig. 2.
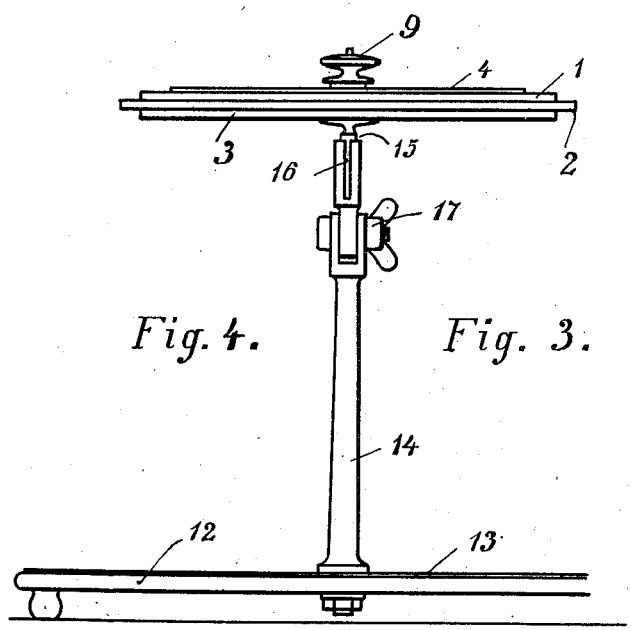
Fig. 4. Fig. 3.
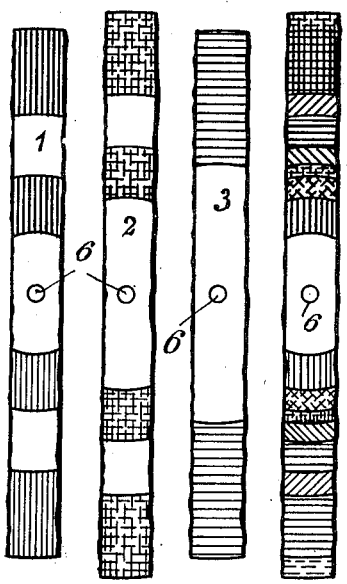
Witnesses:
C. H. Taylor
J. J. McCarthy
Inventor:
F. V. Kallab
by Fetter Freeman Watson
Attorneys.

# UNITED STATES PATENT OFFICE.

FERDINAND VICTOR KALLAB, OF OFFENBACH-ON-THE-MAIN, GERMANY.

COLOR-COMPARATOR.

No. 862,336.　　　　Specification of Letters Patent.　　　　Patented Aug. 6, 1907.

Application filed April 15, 1907. Serial No. 368,293.

*To all whom it may concern:*

Be it known that I, FERDINAND VICTOR KALLAB, a subject of the German Emperor, and a resident of Offenbach-on-the-Main, Germany, have invented certain new and useful Improvements in Color-Comparators, of which the following is a specification.

My invention relates to improvements in translucent color-comparators or color-screens comprising a plurality of superposed translucent or transparent plates each of which is colored with shades of different colors graded from light to deep, which colors, in the example shown, are the primary colors red, yellow, and blue. In such apparatus the plates are shiftable relatively to one another, in such a way as to superpose color-shades of different grades, whereby different colors may be produced.

The object of my improvements is to provide an apparatus of this class, in which the primary colors and the secondary colors produced by mixing two of the primary colors, as well as the tertiary colors produced by mixing three of the primary colors, will be presented in successive gradations, and in which the grades of shades of the primary colors producing a certain secondary or tertiary color, or those of a secondary and primary color producing a certain tertiary color, intended to be analyzed can readily be observed on the apparatus. For this purpose the color shades on the different plates are not of equal areas, so as to cover one another completely, but their areas are so distributed on the plates, that the shades of each color appear at some parts of the surface of the apparatus alone and not blended with one of the colors of the other disks, at other parts in combination with the shades of the color of one of the other plates, and at another part in combination with the shades of the colors of both of the other plates.

A further object of the improvements is to provide a means whereby the combination of shaded colors, or the proportions required for producing the same, can be determined. And for this purpose I provide a translucent gray-disk or plate corresponding to the disks or plates of the apparatus and arranged to be located upon the same, which gray-disk is provided with shades of gray color graded from light to dark.

A further object of the improvements consists in so distributing the colors of the disks, that the light value of the primary and the secondary colors is represented. Said light value corresponds to the effect of the different colors on the retina and is in harmony with the space occupied by the colors in the spectrum or the white light. This rule must therefore be borne in mind in determining harmonious color combinations. The illustration of the light value is therefore an important feature in my improved system and will be of value for educational purposes.

The representation of the light value, the proportions of which are verified by practical experience, accords to the following summary:

Black. Violet. Blue. Green. Red. Orange. Yellow. White.
　0　　⅛　　⅙　　¼　　⅓　　⅜　　¾　　1

It follows, that the sum of the lighting power of two complementary colors is equal to 1 and equal to that of white. The areas attributed to the six main colors are therefore in inverse proportion with the above fractions, while the broadest area is left to black and the tertiary mixed colors produced by combination of three primary colors, whereby comparison of the hues is facilitated.

For the purpose of explaining my invention I have shown in the accompanying drawings an example of an apparatus embodying the improvements referred to above.

In said drawings Figure 1, is a top view of the apparatus, one half of the uppermost shading plate being removed, Fig. 2, is a cross-section of Fig. 1, taken on the line 1—1, Fig. 3 is a view of sectional elements of the disks, placed side by side and showing, how the primary colors are blended together, and the result of such blending together, and Fig. 4 is a view of a stand with the apparatus mounted thereon.

Similar letters of reference refer to similar parts throughout the different views.

In the example shown, three circular color disks 1, 2 and 3 of transparent or translucent material are superposed and mounted on a pivot 5 passing through central holes 6 of the disks. The pivot 5 comprises a handle 7, and a shoulder 8 forming an abutment for the disks 1, 2, and 3. On the opposite side, a nut 9 is screwed to the pivot, a ring 10 of rubber being preferably interposed between said nut and the disks. A further circular disk 4 likewise of translucent material, called hereafter the gray-disk, may in some cases be located between the disks 1, 2 and 3, and the nut 9. The disks 1, 2 and 4 are each provided with a button 11, located at their margins, whereby they can be turned at will, and adjusted relatively to one another and to the disk 3 which may be glued or in another way attached to the shoulder 8.

The area of each of the circular disks 1, 2 and 3 is divided into concentric circles. Ordinarily seven circles are provided; but where the gray disk is used, a further circle will be provided in the center. Some of the circles of each disk are colored with one of the primary or fundamental colors red, yellow, and blue, the circles of the uppermost disk 1 for example being red, those of the central disk 2 yellow, and those of the undermost disk 3 blue. The distribution of these colors on the disk is such that, when looking through the apparatus, in three of the circles the primary colors will appear, in three further circles the secondary colors, and in a further circle the tertiary colors. The distribution of the colors will be apparent from the following table:

| | Red disk. | Yellow disk. | Blue disk. | Color produced by blending. |
|---|---|---|---|---|
| 1st circle | Red | Yellow | Blue | Black or tertiary colors. |
| 2nd " | Red | | Blue | Violet. |
| 3d " | | | Blue | Blue. |
| 4th " | | Yellow | Blue | Green. |
| 5th " | | Yellow | | Yellow. |
| 6th " | Red | Yellow | | Orange. |
| 7th " | Red | | | Red. |

In order to blend together colors of different strengths, the colors of the disks are not uniformly distributed, but vary from the lightest to the deepest shades. For this purpose, the disks are divided into several sectors, and the colors of the disks are graded by sectors from light to deep, the colored stripes of each sector being of the same shade. For practical purposes a division of the disks into twelve sectors will give good results. In the example illustrated, however, I have shown but five sectors. By thus superposing the disks with their colors of even shades registering with one another, which position will be designated as the position of rest, the following colors will be presented (Fig. 3): 1st, the shades of the three primary colors red, yellow, and blue, 2nd, the shades of the three secondary colors orange, green and violet, 3d, the shades of the tertiary black color, which, in its lighter shades, is theoretically gray, in this case, however, is more or less blended with shades of other colors, which, practically, is immaterial.

It will be apparent, that for every one of the secondary and tertiary color shades appearing in the different sectors the proportion of its component primary colors will be presented, because apart from the mixed hues also their constituents are visible in their correct proportions.

The apparatus will be used as follows: If it is desired to examine a certain given color, or one that is intended to be produced, it will first be determined, if said color is a primary or neutral secondary color and appears therefore on the apparatus in its position of rest. If this be not the case, the disks are rotated, after slightly loosening the nut 9, until on the stripes of the secondary or tertiary colors the shade next to that desired appears. In both cases the component primary colors will be found on the same sector therewith. In case a tertiary color is produced, it will also appear of what secondary and primary colors the tertiary color is blended together, so that not only the proportions of red, yellow, and blue are obtained, but also the proportions of red and green, yellow and violet, or orange and blue. Each sector therefore represents an analysis, or synthesis, of a given color, or of one intended to be produced.

A further improvement of the color comparator consists in the use of a translucent gray scale for determining tertiary colors by "breaking", which in its effect is identical with shading pure primary or secondary colors by blending them with black or gray. The disk used for this purpose is divided into sectors having one half of the dimensions of the corresponding sectors of the color disks, and every second one of said sectors is colored with shades of gray color the strength of which is graded from light to deep, the intermediary sectors being uncolored. The gradation of the gray color corresponds to that of the primary colors.

By superposing the gray disk on the color disks all the "broken" colors are presented with the original pure colors, whereby, by using a lighter or deeper shade of gray, the primary and secondary that is the pure colors can be blended to produce tertiary colors, and simultaneously the relations existing between the two methods of producing tertiary colors can be investigated.

The use of the device will be best illustrated by the fact, that with twelve gradations of the color disks by means of a single gradation of the gray disk eight hundred tertiary colors can be produced, so that a gray disk having twelve gradations will produce twelve times eight hundred color shades.

The method of determining complementary colors is self evident, and also that of determining harmonious color combinations. To illustrate the latter method I call attention to the fact, that a primary or secondary color will always harmonize with its complementary color when blended together with gray. Evidently also mixed tones of any given color can be predetermined by superposing a radially arranged scale produced by means of said color on the apparatus, or on a single disk, or on two disks.

The apparatus described is intended to be used by hand, for which purpose it is held against the light or at a certain distance above a white plate. Devices of larger size are to be used with a stand an example of which is shown in Fig. 4. The stand shown consists of a circular plate 12 covered with a white sheet 13, and an arm 14, mounted in the center of the plate, its length depending on the size of the apparatus. At its upper end, the arm shows an axial bore 15 and longitudinal slits 16. The extension 7 of the pivot 5 of the apparatus will be received in said axial bore and held therein by the spring action of the upper part of the arm. When so arranged, the disks have a horizontal position, whereby the colors can be investigated with the light rays coming from above. Furthermore, the arm may be provided, near its upper end, with a joint 17, so that the disks can be turned at a right angle. Thereby they can be brought into a vertical position, so that the examination of the colors can also take place with direct light.

In the foregoing the apparatus has been described as consisting of circular plates mounted on a common pivot about which they may be rotated. It is evident, however, that the plates need not be of the particular form illustrated, nor is it necessary that the succession of colors distributed in the various stripes be exactly that given in the foregoing table.

In the foregoing, the plates or disks have been described as being divided into subsections. It is evident that the division lines must not necessarily be marked on each plate, as the border lines of the colors will present the same.

As examples of the translucent or transparent material used for the plates the following may be given: glass, celluloid, gelatin, or mica. The shades of the colors may be applied to the disks in any preferred way.

The apparatus described will advantageously be used in all such cases in which colors are to be compared or harmonious color combinations are to be produced.

I claim.

1. A color comparator comprising a plurality of superposed plates admitting the passage of light, each of said plates being colored with shades of a color graded from light to deep and so arranged on the plates as to cover one another in part, a remaining portion of the shades of each color being uncovered.

2. A color comparator comprising three superposed plates admitting the passage of light, each of said plates admitting the passage of light, each of said plates being colored with shades of one of the primary colors graded from light to deep and so arranged on the plates as to cover one another in part, a further portion of the shades of each color being covered by the shades of one of the other colors, and a remaining portion thereof being uncovered.

3. A color comparator comprising a plurality of superposed plates admitting the passage of light, each of said plates being colored with shades of a color graded from light to deep and so arranged on the plates as to cover one another in part a remaining portion of the shades of each color being uncovered said plates being adapted to be moved upon one another so as to vary the combinations of the shades of the colors covering one another.

4. A color comparator comprising three superposed plates admitting the passage of light, each of said plates being colored with shades of one of the primary colors graded from light to deep and so arranged on the plates as to cover one another in part, a further portion of the shades of each color being covered by the shades of one of the other colors, and a remaining portion thereof being uncovered, said plates being adapted to be moved upon one another so as to vary the combinations of the shades of the colors covering one another.

5. A color comparator comprising a plurality of superposed plates admitting the passage of light, each of said plates being colored with shades of a color graded from light to deep and so arranged on the plates as to cover one another in part a remaining portion of the shades of each color being uncovered, and a plate admitting the passage of light adapted to be placed over said color plates and colored with shades of gray graded from light to deep.

6. A color comparator comprising a plurality of superposed plates admitting the passage of light, each of said plates being colored with shades of a color graded from light to deep and so arranged on the plates as to cover one another in part a remaining portion of the shades of each color being uncovered, and a plate admitting the passage of light adapted to be placed on said colored plates and colored with shades of gray graded from light to deep, said shades of gray being so arranged that each of the shades covers a part of one of the shades of the color plates.

7. A color comparator comprising a plurality of superposed plates admitting the passage of light, each of said plates being colored with shades of a color graded from light to deep and so arranged on the plates as to cover one another in part a remaining portion of the shades of each color being uncovered and a plate admitting the passage of light adapted to be placed on said color plates and colored with shades of gray from light to deep, said shades of gray being so arranged that each of the shades covers a part of one of the shades of the color plates, said color plates and gray plates being adapted to be adjusted upon one another so as to vary the combinations of the shades covering one another.

In testimony whereof I have signed my name to this specification in the presence of two subscribing witnesses.

FERDINAND VICTOR KALLAB.

Witnesses:
 ERWIN DIPPEL,
 MICHAEL VOLK.